Figure 3:
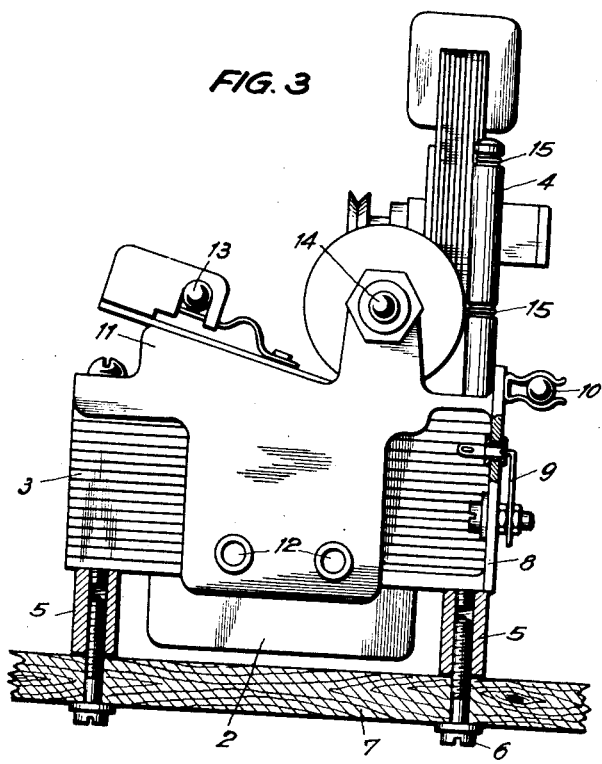

Dec. 14, 1954
R. RUHNAU ET AL
2,697,180
UNITARY ELECTRIC DRIVE AND CONTROL
UNIT FOR FILM PROJECTORS
Filed July 30, 1952
2 Sheets-Sheet 1
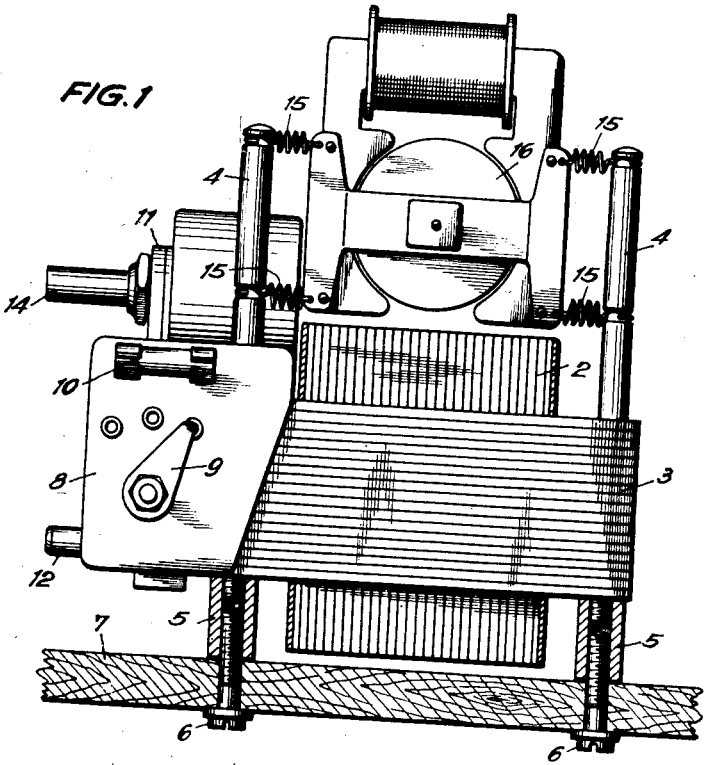
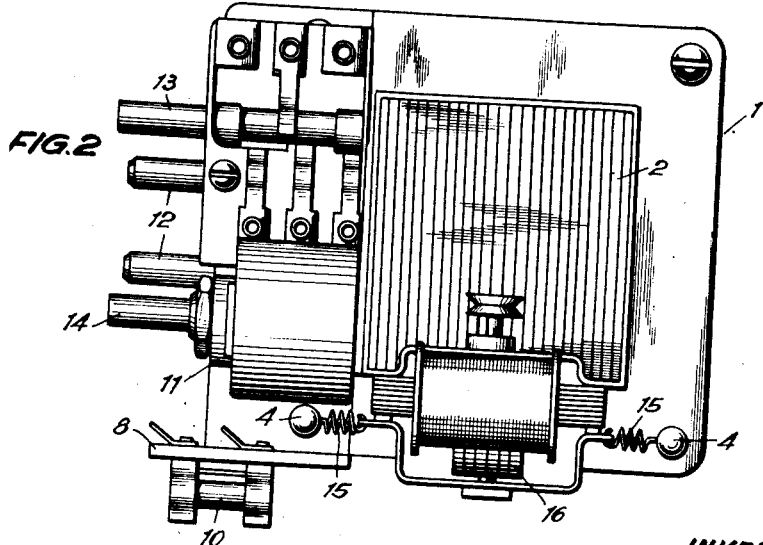
INVENTORS
R. Ruhnau
E. Weides
G. Engelage
By [signature] ATTYS Dec. 14, 1954

R. RUHNAU ET AL 2,697,180

UNITARY ELECTRIC DRIVE AND CONTROL
UNIT FOR FILM PROJECTORS

Filed July 30, 1952

2 Sheets-Sheet 2

INVENTORS
R. Ruhnau
E. Weides
G. Engelage
ATTYS.

United States Patent Office 2,697,180
Patented Dec. 14, 1954

2,697,180

UNITARY ELECTRIC DRIVE AND CONTROL UNIT FOR FILM PROJECTORS

Richard Ruhnau, Berlin-Tempelhof, and Erich Weides and Gunter Engelage, Langel, near Koln, Germany Application July 30, 1952, Serial No. 301,712

Claims priority, application Germany August 7, 1951

3 Claims. (Cl. 310—66)

This invention relates to an arrangement for the electric drive of cinema projectors, particularly for narrow gauge film.

The drive of the cinema projectors is effected by an electric motor which is fed either from direct current mains, or through a transformer from alternating current mains. Further electric appliances required for the operation of a cinema projector are an electric supply plug, a switch, a switch-board and a control rheostat. Hitherto the arrangement of these appliances in the casing of the cinema projector was laid out preferably from the point of view of good accessibility and operation. The consequence was an involved arrangement of the wires and cables serving for the electric connection of the individual electric appliances. Accordingly the original manufacturing as well as the maintainance of these cinema projectors involved considerable expenditure in time and materials as regards wiring and cable connections.

These disadvantages are obviated according to the invention in that the electric appliances of the cinema projector such as current supply plug, switch, switch-board, transformer, control rheostat and driving motor are integrated into a compact electric unit.

It has been found particularly useful, to construct the electric unit for the cinema projector according to the invention in such a manner that the transformer, which is attached to a wall, for example, to the bottom board, of the cinema projector, carries on one lateral face a bracket with the current supply plug, the switch and the control rheostat, and on a second lateral face at a right angle to the first one, the switch-board with the voltage selector and fuse, while the driving motor is arranged between two support bolts projecting from the transformer.

In order to prevent the transmission of shocks, oscillations and the sound of the driving motor to the other components of the cinema projector, the driving motor is supported, in accordance with the invention, by impact and oscillation-damping and/or sound deadening means such as springs, rubber-buffers or bands. Such a construction has the advantage that the mounting and wiring of the individual electric appliances can be carried out in an electrician's workshop while in the final assembly of the cinema projector the pre-assembled electric unit can be fitted with a minimum expenditure of time.

In the accompanying drawings an embodiment is shown of an arrangement for the electric drive of cinema projector according to the invention. Figures 1, 2 and 3 show the electric unit in front elevation, plan view and side elevation, respectively.

The transformer 1, the coil windings 2 of which are carried by a packet of laminations 3 tightened by the suspension bolts 4 and the hexagon nuts 5, is attached to the bottom plate 7 of the cinema projector by means of the screw 6. To one of the lateral walls of the packet of laminations 3 the switch-board 8 is screwed, which carries the voltage selector 9 and the fuse 10. A bracket 11 arranged on a second face of the transformer carries the supply plug 12, the switch 13 and the control rheostat 114. Between the suspension bolts 4, the driving motor 16 is suspended by means of springs 15. The switchboard 8 and the bracket 11 may consist alternatively of a single insulating pressed piece.

The electric unit requires little space and is particularly suitable for being fitted into small portable projectors.

We claim:

1. A unitary electric drive and control unit for film projectors, comprising a transformer, means for securing said transformer to one plate of a film projector, a pair of support plates carried by said transformer upon lateral sides thereof, electrical control devices mounted upon said support plates, spaced support studs secured to and extending from another side of said transformer, and a drive motor resiliently carried between said studs.

2. A unit in accordance with claim 1, in which said devices include a current supply plug, a switch and a rheostat mounted upon one of said support plates, and a fuse and a voltage selecting switch mounted upon the other of said support plates.

3. A unit in accordance with claim 1, including tension springs connecting said drive motor to said studs to support the same therebetween.

References Cited in the file of this patent

UNITED STATES PATENTS

| Number | Name | Date |
|---|---|---|
| 1,162,138 | Clark | Nov. 30, 1915 |
| 2,102,481 | Noel | Dec. 14, 1937 |
| 2,588,012 | Kirkpatrick | Mar. 4, 1952 |

FOREIGN PATENTS

| Number | Country | Date |
|---|---|---|
| 616,468 | Germany | July 29, 1935 |